(12) United States Patent
Zhang et al.

(10) Patent No.: US 10,229,759 B2
(45) Date of Patent: Mar. 12, 2019

(54) REACTIVITY CONTROL METHOD AND TELESCOPED CONTROL ROD FOR PEBBLE-BED HIGH-TEMPERATURE GAS-COOLED REACTOR

(71) Applicant: TSINGHUA UNIVERSITY, Beijing (CN)

(72) Inventors: Zuoyi Zhang, Beijing (CN); Xingzhong Diao, Beijing (CN); Zhengming Zhang, Beijing (CN); Libin Sun, Beijing (CN); He Yan, Beijing (CN)

(73) Assignee: TSINGHUA UNIVERSITY, Beijing (CN)

( * ) Notice: Subject to any disclaimer, the term of this patent is extended or adjusted under 35 U.S.C. 154(b) by 316 days.

(21) Appl. No.: 14/916,504

(22) PCT Filed: Sep. 3, 2014

(86) PCT No.: PCT/CN2014/085811
§ 371 (c)(1),
(2) Date: Mar. 3, 2016

(87) PCT Pub. No.: WO2015/032316
PCT Pub. Date: Mar. 12, 2015

(65) Prior Publication Data
US 2016/0196884 A1    Jul. 7, 2016

(30) Foreign Application Priority Data
Sep. 3, 2013   (CN) .......................... 2013 1 0395436

(51) Int. Cl.
*G21C 7/107*  (2006.01)
*G21C 7/11*   (2006.01)
(Continued)

(52) U.S. Cl.
CPC ................ *G21C 7/107* (2013.01); *G21C 7/11* (2013.01); *G21C 7/12* (2013.01); *G21C 7/14* (2013.01);
(Continued)

(58) Field of Classification Search
CPC . G21C 7/107; G21C 7/11; G21C 7/12; G21C 7/14; G21C 7/20
See application file for complete search history.

(56) References Cited

U.S. PATENT DOCUMENTS 3,365,368 A  *  1/1968  Fray .......................... G21C 7/10
                                                    376/227
3,915,793 A  *  10/1975  Andersson ............. G21C 3/326
                                                    376/352
(Continued)

FOREIGN PATENT DOCUMENTS

CN          1174382       2/1998
CN          103456374     12/2013
(Continued)

*Primary Examiner* — Lily C Garner
(74) *Attorney, Agent, or Firm* — IP & T Group LLP

(57) ABSTRACT

A reactor lateral reflection layer telescoped control rod capable of separately achieving cold shutdown includes an inner rod, an outer rod and a guide cylinder assembly which are vertically and coaxially arranged, wherein the outer rod and the guide cylinder assembly are hollow cylindrical bodies; the top end of the inner rod can move up and down inside the outer rod and the other end of the inner rod moves up and down, along with the top end, inside a control rod passage which is positioned below the guide cylinder assembly and is coaxial with the guide cylinder assembly; and the top end of the outer rod can move up and down in the guide cylinder assembly and the other end of the outer rod moves up and down, along with the top end, inside the control rod passage.

7 Claims, 9 Drawing Sheets

(51) Int. Cl.
*G21C 7/12* (2006.01)
*G21C 7/14* (2006.01)
*G21C 7/20* (2006.01)

(52) U.S. Cl.
CPC ............... *G21C 7/20* (2013.01); *Y02E 30/33* (2013.01); *Y02E 30/36* (2013.01); *Y02E 30/39* (2013.01)

(56) References Cited

U.S. PATENT DOCUMENTS

| | | | | | |
|---|---|---|---|---|---|
| 3,932,215 | A | * | 1/1976 | Kruger | ............... G21C 7/14 376/233 |
| 4,481,164 | A | * | 11/1984 | Bollinger | ............... G21C 7/103 376/209 |
| 4,820,478 | A | * | 4/1989 | Freeman | ............... G21C 7/11 376/333 |
| 5,075,072 | A | * | 12/1991 | Vollman | ............... G21C 7/11 376/227 |
| 5,098,647 | A | * | 3/1992 | Hopkins | ............... G21C 5/02 376/353 |

FOREIGN PATENT DOCUMENTS

| | | | | |
|---|---|---|---|---|
| DE | 2856246 A1 * | 7/1980 | ............... | G21C 1/07 |
| EP | 0 229 030 | 7/1987 | | |
| GB | 1275656 A * | 5/1972 | ............... | G21C 7/12 |
| JP | 1-288795 | 11/1989 | | |
| JP | 2856457 B2 * | 2/1999 | | |
| JP | 2000-171581 | 6/2000 | | |
| WO | WO 00/39808 | 7/2000 | | |

\* cited by examiner

REACTIVITY CONTROL METHOD AND TELESCOPED CONTROL ROD FOR PEBBLE-BED HIGH-TEMPERATURE GAS-COOLED REACTOR

This application is a national stage application of PCT/CN2014/085811 filed on Sep. 3, 2014, which claims priority of Chinese patent application number 201310395436.0 filed on Sep. 3, 2013. The disclosure of each of the foregoing applications is incorporated herein by reference in its entirety.

TECHNICAL FIELD OF THE INVENTION

The invention relates to nuclear power plant reactivity control and control rod design for a modular pebble-bed high-temperature gas-cooled reactor and particularly relates to a reactivity control method and a telescoped control rod for a pebble-bed high-temperature gas-cooled reactor.

TECHNICAL BACKGROUND OF THE INVENTION

A pebble-bed high-temperature gas-cooled reactor originated from an AVR experimental reactor in Germany Based on success of the AVR reactor experiment, in the 1970s, i.e. in the high-speed development period of world nuclear power, the thorium high-temperature gas-cooled reactor demonstration power plant (THTR-300) with electric power of 300 MW was built and operated in Germany. With occurrence of the nuclear power plant accidents of Three Mile Island in the USA and Chernobyl in the Soviet Union, the public and supervision authorities in various countries increasingly pay more attention to safety of nuclear power plants, and thus, the development trend of high-temperature gas-cooled reactor commercial power plant is changed into a modular high-temperature gas-cooled reactor with passive inherent safety from original large-scale direction. The high-temperature gas-cooled reactor nuclear power plant demonstration project (HTR-PM) of the HuaNeng ShanDong Shi-Dao Bay nuclear power plant, which has been constructed in China, is a typical modular pebble-bed high-temperature gas-cooled reactor.

Due to high single-reactor power of the thorium high-temperature gas-cooled reactor (THTR-300), two sets of control rod systems are arranged, wherein one set of control rod system is provided with 36 regulating rods that are arranged on a lateral reflection layer and used for regulating rapid reactivity change and hot shutdown under the accident working condition; and the other set of control rod system is provided with 42 control rods and the 42 control rods are inserted into a reactor core pebble bed and are used for carrying out long-term cold shutdown and ensuring a certain cold shutdown depth. The operating experience of the thorium high-temperature gas-cooled reactor shows that the control rods inserted into the reactor core pebble bed require a huge driving force to overcome resistance of stacked spherical fuel elements, which causes damage to the fuel elements. Therefore, only the lateral reflection layer control rods are retained in the later design of the modular pebble-bed high-temperature gas-cooled reactor HTR-MODUL.

The HTR-MODUL has single-reactor thermal power of 200 MW, a reactor core diameter of 3 m and a reactor core average height of 9.4 m. Reactivity control and Shutdown systems of the HTR-MODUL include a control rod system and an absorption sphere shutdown system, the control rod system is provided with six control rods in total, the six control rods are arranged at the lateral reflection layer, and each control rod corresponds to a set of driving mechanism for enabling the control rod to move up and down. Each control rod has an absorber length of 4,800 mm and a total length of 5,280 mm and is divided into ten sections in total, each control rod has an outer diameter of 10.5 mm, each control rod has a pore diameter of 130 mm, a cladding material adopted by the control rods is X8CrNiMoNb 1616, the total weight of each control rod is 104 kg, and the highest design temperature of each control rod is about 900 DEG C. The control rod system of the HTR-MODUL has the main functions of reactor power regulation and hot shutdown.

Design parameters of the control rods show that the control rods are of a multi-section single-rod structure; since all the control rods need to be taken out of an active region when the reactor operates under the full power, the length of an absorber of each control rod is about half the height of the reactor core active region due to the limitation of the height of a reactor pressure vessel.

Except for the control rod system, the other set of reactivity control and shutdown system of the HTR-MODUL is the absorption sphere shutdown system. The system is provided with 18 lines of absorption spheres which are also positioned at the lateral reflection layer of the reactor, the absorption spheres fall into pore passages of the lateral reflection layer by means of gravity and are returned to a sphere storage tank from the pore passages of the lateral reflection layer in a pneumatic conveying manner. The system has the main functions that: 1, when the reactor is started and operates under low power, the absorption sphere shutdown system works together with the control rod system to carry out reactivity control; and 2, the absorption sphere shutdown system separately achieves cold shutdown and ensures a certain cold shutdown depth.

The above mentioned reactivity control of the HTR-MODUL has the following problems that: 1, the absorption sphere shutdown system has a great number of functional requirements, is complex in system design and has a high requirement for operation reliability; 2, when the reactor is started and operates under low power, a reactor operator not only needs to operate the control rod system, but also needs to blow the absorption spheres up in a pneumatic conveying manner from each absorption sphere pore passage, and the amount of the absorption spheres conveyed each time needs to be accurate and controllable, which brings great operation difficulty to the reactor operator and is likely to cause accidents.

Therefore, design of the HTR-PM reactivity control and shutdown system adopts the following technical innovations that: two sets of mutually independent systems, the control rod system and the absorption sphere system, are still retained but the functions of the two sets of systems are regulated; the control rod system is divided into safety rod banks, regulating rod banks and shim rod banks, the safety rod banks are all taken out of the reactor active region when the reactor is started and operates under low power, the value of the safety rod banks is sufficient to ensure shutdown under any reactor working condition, the regulating rod banks perform reactor power regulation so as to flatten reactor core power distribution and compensate reactivity change of a reactor core during the normal operation, the shim rod banks are used for compensating reactivity change after the reactor operates for a long time; as actuating mechanisms of a reactor protection system, the safety rod banks and the regulating rod banks can rapidly achieve hot shutdown, assumed that one control rod with the highest reactivity value is in failure; and when the reactor is started and operates under low power, the regulating rod banks and the shim rod banks cooperate to carry out reactivity control. If all the control rods are put in. Cold shutdown can be separately achieved and a certain cold shutdown depth is ensured. As a standby shutdown system, the absorption sphere shutdown system does not participate in startup of the reactor and operation at all power levels and can be manually put into use as required; and when the control rod system and the absorption sphere shutdown system are put into use together, long-term cold shutdown or overhaul shutdown can be achieved.

SUMMARY OF THE INVENTION

Technical Problems to be Solved

The invention aims to solve the technical problems that under the condition of keeping structural design parameters of a pressure vessel, reactor internals and the like of an existing modular pebble-bed high-temperature gas-cooled reactor unchanged essentially, only a control rod system is used to achieve cold shutdown and ensure a certain shutdown depth.

Technical Scheme

The invention adopts the following technical scheme:
a telescoped control rod for a pebble-bed high-temperature gas-cooled reactor comprises an inner rod, an outer rod and a guide cylinder assembly which are vertically and coaxially arranged, wherein the outer rod and the guide cylinder assembly are hollow cylindrical bodies; the top end of the inner rod can move up and down inside the outer rod and the other end of the inner rod moves up and down, along with the top end, inside a control rod passage which is positioned below the guide cylinder assembly and is coaxial with the guide cylinder assembly; and the top end of the outer rod can move up and down in the guide cylinder assembly and the other end of the outer rod moves up and down, along with the top end, inside the control rod passage.

Preferably, the inner rod is of a multi-section structure and comprises a coupling head assembly, an anti-impact head assembly and a plurality of internal section rods connected in series by sphere articulated joints, wherein one end of the coupling head assembly is connected with the internal section rod at the first section and the other end of the coupling head assembly is connected with a loop chain of a control rod driving mechanism; and one end of the anti-impact head assembly is connected with the internal section rod at the tail section.

Preferably, the coupling head assembly comprises a coupling head, a flat pin, a locking bead ring, a buffer pressure plate, a cylinder spring, a bearing pressure plate, a ceramic ball, a bearing bottom plate and a sphere joint; the coupling head is connected with the loop chain of the control rod driving mechanism by the flat pin and the locking bead ring is used for encircling and fastening the flat pin; and the buffer pressure plate is arranged on the cylinder spring to form a buffer structure, the buffer structure is externally arranged on the side wall of the coupling head, the sphere joint is in threaded connection with the bearing pressure plate and is in spherical fit with the upper end plate of the internal section rod, a thrust bearing structure is formed by the ceramic ball, the bearing pressure plate and the bearing bottom plate together, and the thrust bearing structure is externally sleeved by the coupling head.

Preferably, each internal section rod comprises an outer sleeve, an upper end plate and a lower end plate respectively positioned at both ends of the outer sleeve, and a B4C pellet that is welded and packaged between the upper end plate and the lower end plate and is positioned in the outer sleeve; gaps are reserved between the B4C pellet and the outer sleeve and between the B4C pellet and the upper end plate; and a hold-down spring is arranged between the B4C pellet and the upper end plate.

Preferably, the anti-impact head assembly comprises a buffer pressure plate, a disk spring and an anti-impact head, wherein a bulge is formed on the side wall of the anti-impact head and the disk spring is arranged between the bulge and the buffer pressure plate.

Preferably, a top inner shrunk opening and a top outer shaft shoulder are formed at the top of the outer rod; and the outer rod is of a multi-section structure and comprises a sliding sleeve type shock absorber, hanging assemblies and a plurality of external section rods, the hanging assemblies are connected with the corresponding external section rods, and the sliding sleeve type shock absorber is connected with the external section rod at the head end.

Preferably, each external section rod comprises an inner sleeve, an outer sleeve, an upper end plate, a lower end plate, a hold-down spring and a B4C pellet, wherein the B4C pellet is mounted in an annular space defined by the inner sleeve, the outer sleeve, the upper end plate and the lower end plate and gaps are reserved between the B4C pellet and the inner and outer sleeves as well as the upper end plate; the hold-down spring is arranged between the B4C pellet and the upper end plate; and the outer sleeve is provided with a vent hole.

Preferably, all the hanging assemblies are the same in the number of hanger ring structures arranged. Each hanger ring structure comprises two sphere pendants, two cylindrical pins, a long hanger ring and two check rings; the sphere pendants are mounted in inner side grooves of the upper end plate and the lower end plate; the sphere pendants are connected with the long hanger ring by the cylindrical pins and the cylindrical pins are fixed with the check rings; and gaps are reserved among the sphere pendants, the cylindrical pins and the long hanger ring.

The guide cylinder assembly comprises an upper segment, a middle segment and a lower segment; the upper segment and the middle segment are fixedly mounted on an upper bearing plate for the metal reactor internals together; the upper segment is positioned above the bearing plate and a gap is reserved between the upper segment and a reactor pressure vessel sealing head; the middle segment is positioned under the bearing plate and passes through a plurality of layers of reactor core pressure plates; the bottom of the middle segment is inserted into the lower segment; the lower segment is fixed to the upper bearing plate and a metal reactor internal positioning plate and can be inserted into a top carbon brick and a top reflection layer graphite brick by a certain depth according to a designed length; and a positioning ring is welded at the lower end of the lower segment.

The invention further provides a reactivity control method for the pebble-bed high-temperature gas-cooled reactor.

The reactivity control method for the pebble-bed high-temperature gas-cooled reactor comprises: a rod inserting process and a rod lifting process;
in the rod inserting process, at the top half section of the control rod travel, the outer rod and the inner rod move together under the dragging action of the driving mechanism, when the top end of the outer rod descends to a reactor active region upper edge, the outer shaft shoulder of the outer rod is lapped to the positioning ring at the bottom end of the guide cylinder assembly and at this moment, the outer rod does not move downwards any more under the bearing action of the positioning ring of the guide cylinder assembly, i.e. the outer rod reaches the lower limit of the travel;

the inner rod can be further inserted downwards along the inner sleeve of the outer rod under the drive of the driving mechanism and is separated from the outer rod, till reaching the lower limit of the travel, and at this moment, the outer rod and the inner rod cover a whole reactor core active region;

in the rod lifting process, at the bottom half section of the control rod travel, only the inner rod moves upwards under the dragging action of the driving mechanism and is gradually inserted into the outer rod until the inner rod is in contact with the inner shrunk opening of the outer rod and the inner rod and the outer rod are completely overlapped; and the rod lifting operation is further carried out, the inner rod and the outer rod move upwards together and gradually enter the guide cylinder assembly, and when both the inner rod and the outer rod are positioned at the reactor active region upper edge, the rod lifting limit is reached.

Beneficial Effects

The telescoped control rod for the pebble-bed high-temperature gas-cooled reactor, which is provided by the embodiment of the invention, has the following beneficial effects:
(1) technical conditions are created for the modular pebble-bed high-temperature gas-cooled reactor to carry out reactivity control and shutdown only by utilizing a control rod system; the startup and operating control operation of the modular pebble-bed high-temperature gas-cooled reactor is simplified; and functional requirements of an absorption sphere shutdown system are reduced and design complexity of the absorption sphere shutdown system is reduced.
(2) due to limitation of the height of the reactor pressure vessel and the like, the length of each control rod of the existing modular pebble-bed high-temperature gas-cooled reactor is only about half the height of the reactor core active region, however, on the premise of not changing the height of the pressure vessel and other total design parameters of the existing modular pebble-bed high-temperature gas-cooled reactor, the spread length of the telescoped control rod provided by the invention can cover the height of the whole reactor core active region; so that reactivity value of the control rod system is improved to the greatest extent.
(3) spring shock absorbers are arranged at multiple positions on the telescoped control rod provided by the embodiment of the invention, so that various impact loads can be effectively reduced and operation reliability of the control rod can be improved.
(4) the telescoped control rod provided by the embodiment of the invention is of a detachable structure, which facilitates processing, manufacturing, packaging, transportation and nuclear power plant field installation.

DETAILED DESCRIPTION OF THE EMBODIMENTS

The specific implementation of the invention is further described by combining the accompanying drawings and embodiments. The embodiments below are only used for illustrating the invention, but not used for limiting the scope of the invention.

Figure 1:
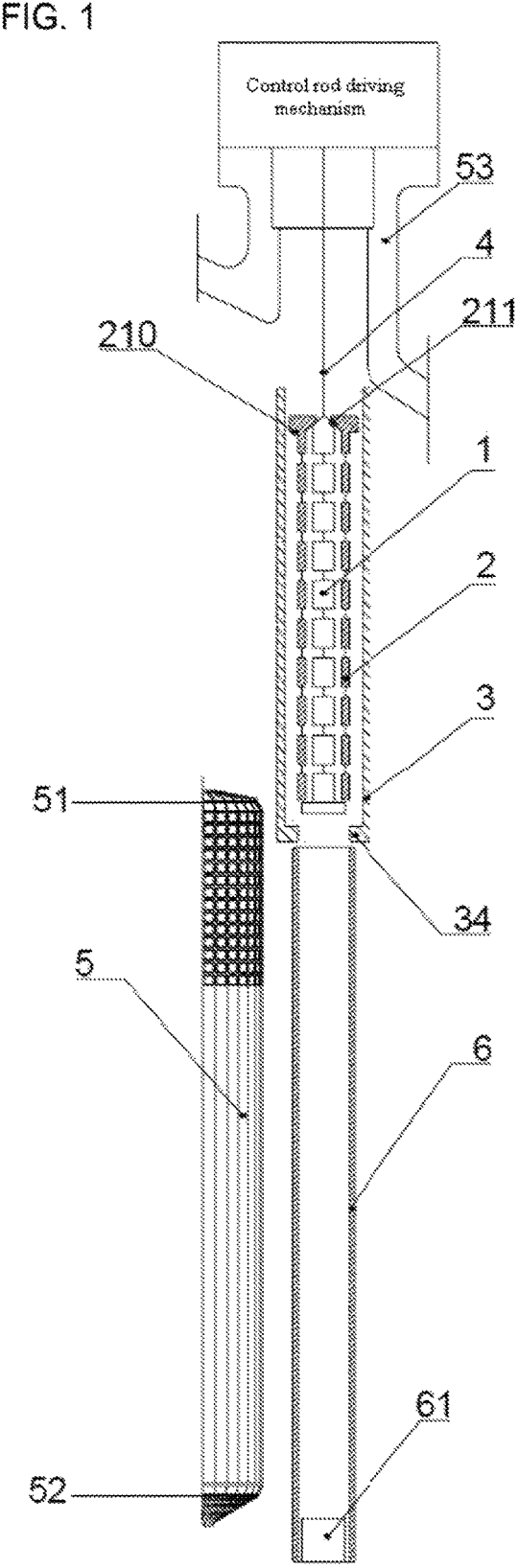
FIG. 1 is an operating principle diagram of the upper limit of the travel of a telescoped control rod according to one embodiment of the invention.
Figure 2:
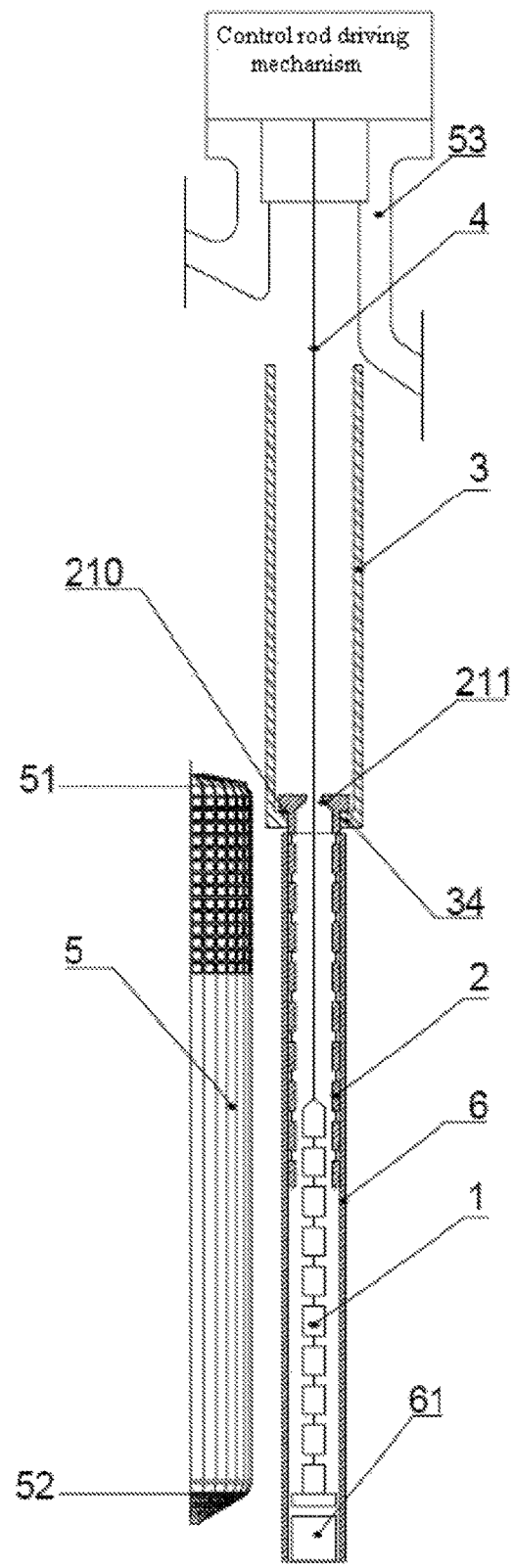
FIG. 2 is an operating principle diagram of the lower limit of the travel of the telescoped control rod according to one embodiment of the invention.

FIG. 1 and FIG. 2 show an operating principle diagram of a telescoped control rod according to one embodiment of the invention. The telescoped control rod comprises: an inner rod 1, an outer rod 2 and a guide cylinder assembly 3. The inner rod 1 is connected with a loop chain 4 of a control rod driving mechanism by a coupling head assembly and moves up and down under the dragging action of the driving mechanism in the guide cylinder assembly 3 and a control rod graphite passage 6; the movement lower limit of the inner rod 1 is limited by the maximum length of the loop chain 4 and reaches a reactor active region lower edge 52; the movement upper limit of the inner rod 1 is limited by the height of a reactor pressure vessel and is higher than a reactor active region upper edge 51; the inner rod I can be kept above an active region in a dynamic manner by the driving mechanism; and in the case of accident shutdown, a driving mechanism power supply is switched of and the inner rod 1 falls into a lateral reflection layer of the active region by means of the gravity, which meet the design principle of fault safety.

The top of the outer rod 2 is provided with an inner shrunk opening 25 and an outer shaft shoulder 24, the inner rod 1 is inserted from the bottom of the outer rod 2, and by utilizing the inner shrunk opening 25, the outer rod 2 can be lapped to the inner rod 1. At the top half section of the control rod travel, the outer rod 2 and the inner rod 1 move together under the dragging action of the driving mechanism, when the integral outer rod 2 is positioned below the reactor active region upper edge 51, the outer shaft shoulder 24 of the outer rod 2 is lapped to a positioning ring 34 at the bottom end of the guide cylinder assembly 3 and at this moment, the outer rod 2 does not move downwards any more under the bearing action of the positioning ring 34 of the guide cylinder assembly 3, i.e. the outer rod 2 reaches the lower limit of the travel; and the inner rod 1 can be further inserted downwards along inner sleeves of the outer rod 2 under the drive of the driving mechanism and is separated from the outer rod 2, till reaching the lower limit of the travel, and at this moment, the outer rod 2 and the inner rod 1 cover a whole reactor core active region 5, and thus the reactivity value of the control rod is improved to a great extent. Conversely, in the rod lifting process, at the bottom half section of the control rod travel, only the inner rod 1 moves upwards under the dragging action of the driving mechanism and is gradually inserted into the outer rod 2 until the inner rod 1 is in contact with the inner shrunk opening 25 of the outer rod 2 and the inner rod 1 and the outer rod 2 are completely overlapped; then, the rod lifting operation is further carried out, the inner rod 1 and the outer rod 2 move upwards together and gradually enter the guide cylinder assembly 3, and when both the inner rod 1 and the outer rod 2 are positioned at the reactor active region upper edge 51, the rod lifting limit is reached; at this moment, a reactor can operate under full power. In conclusion, the spread length of the telescoped control rod according to the invention is gradually increased up to the whole reactor core active region 5 in the rod inserting process, and conversely, in the rod lifting process, the spread length of the telescoped control rod is gradually decreased and is finally only half the height of the reactor core active region 5.

Figure 3:
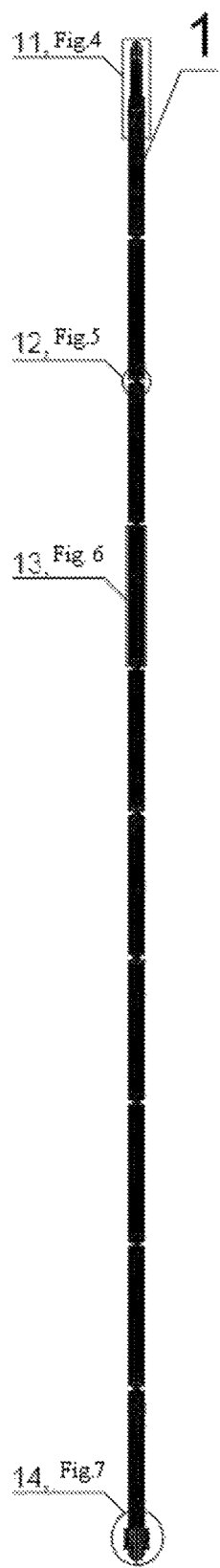
FIG. 3 is a diagram of a multi-section inner rod connection structure according to one embodiment of the invention.
Figure 4:
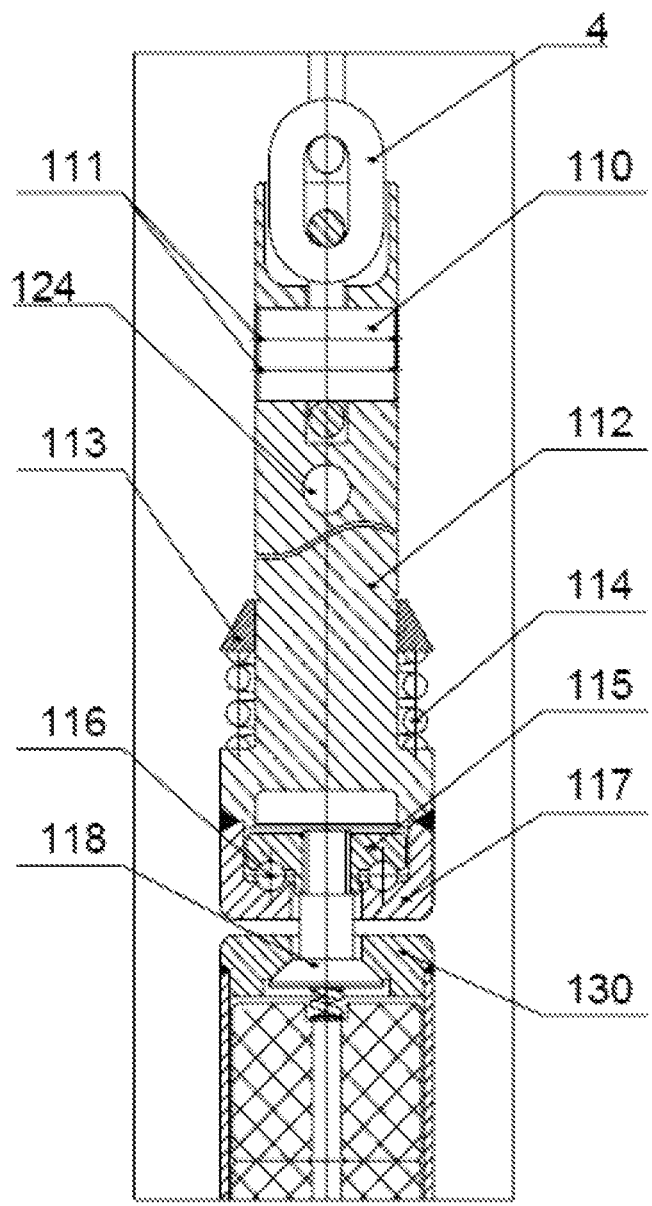
FIG. 4 is a structural diagram of a coupling head assembly in the multi-section inner rod connection structure according to one embodiment of the invention.
Figure 5:
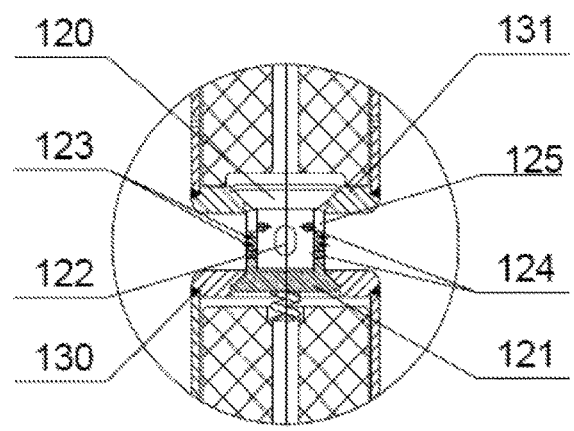
FIG. 5 is a structural diagram of a sphere articulated joint assembly in the multi-section inner rod connection structure according to one embodiment of the invention.
Figure 6:
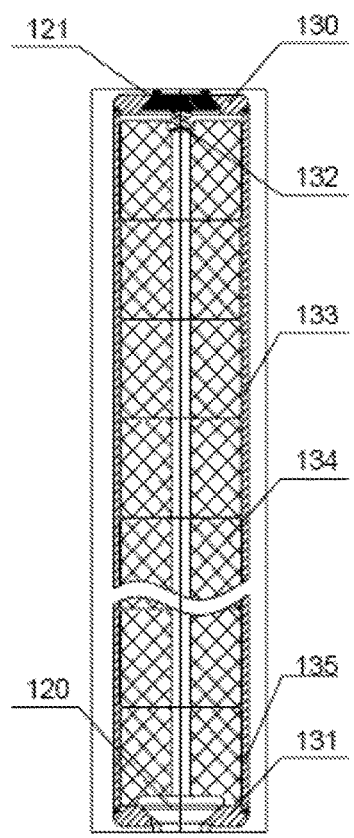
FIG. 6 is a structural diagram of a single inner rod assembly in the multi-section inner rod connection structure according to one embodiment of the invention.
Figure 7:
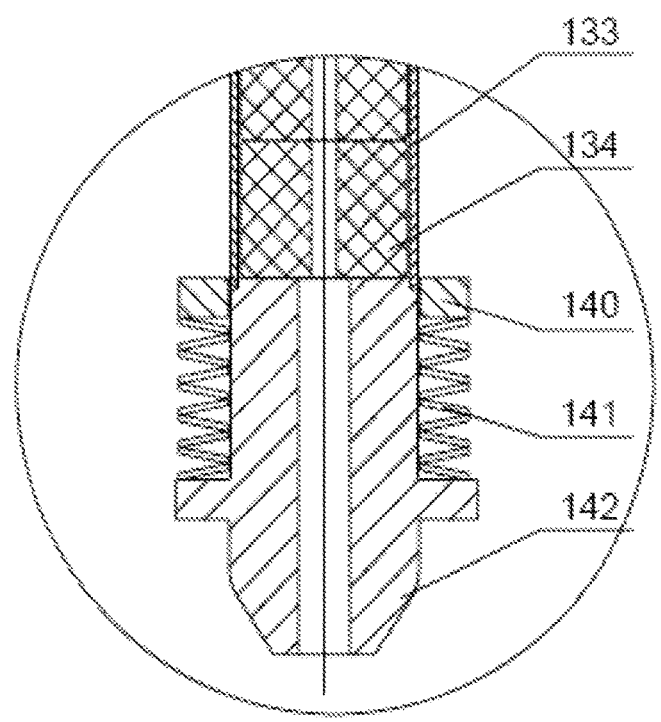
FIG. 7 is a structural diagram of an anti-impact head assembly in the multi-section inner rod connection structure according to one embodiment of the invention.

An operating passage of the outer rod 2 and the inner rod 1 is formed by the guide cylinder assembly 3 and the control rod graphite passage 6 together, the guide cylinder assembly 3 takes a guiding effect on operation of the outer rod 2 and the inner rod 1 and meanwhile, the outer rod 2 and the inner rod 1 are prevented from impacting with other reactor internals under the seismic condition; and the positioning ring 34 is welded at the lowermost end of the guide cylinder assembly 3 so as to limit the maximum inserting-down travel of the outer rod 2.

wherein, in order to illustrate a multi-section structure clearly, a 10-section structure is illustrated as one example. The structural form of the multi-section inner rod 1 is as shown in FIG. 3 and the multi-section inner rod 1 comprises: a coupling head assembly 11, nine sphere articulated joints 12, ten internal section rods 13 and an anti-impact head assembly 13, wherein the coupling head assembly 11, as shown in FIG. 4, is composed of a flat pin 110, a locking bead ring 111, a coupling head 112, a buffer pressure plate 113, a cylinder spring 114, a bearing pressure plate 115, a ceramic ball 116, a bearing bottom plate 117 and a sphere joint 118; the coupling head 112 is connected with the loop chain 4 of the control rod driving mechanism by the flat pin 110 and the locking bead ring 111 is used for preventing the flat pin 110 from falling off; when the inner rod 1 is lifted upwards from the bottom of the control rod graphite passage 6, the moving inner rod 1 can be collided with the static outer rod 2 and the buffer pressure plate 113 and the cylinder spring 114 can buffer the collision; a thrust bearing structure is formed by the ceramic ball 116, the bearing pressure plate 115 and the bearing bottom plate 117 together and has the main effect of avoiding causing distortion of the loop chain 4 of the driving mechanism and influencing operation of the driving mechanism due to uneven weight distribution; the sphere joint 118 is in threaded connection with the bearing pressure plate 115, is spot-welded with the bearing pressure plate 115 and is in spherical fit with an internal section rod upper end plate 130 so as to ensure mutual flexible rotation between the coupling head assembly 11 and the corresponding internal section rod 13;

each internal section rod 13, as shown in FIG. 6, is composed of an outer sleeve 133, the upper end plate 130, a lower end plate 131, a hold-down spring 132 and a B4C pellet 134; the B4C pellet 134 is a neutron absorber and is welded and packaged in the outer sleeve 133; gaps are reserved between the B4C pellets 134 and the outer sleeves 133 as well as the upper end plates 130 so as to compensate irradiation swelling of the B4C pellets 134; in order to prevent the B4C pellets 134 from being displaced, the hold-down springs 132 are arranged at the tops of the B4C pellets 134; the B4C pellets 134 can generate helium when being irradiated by neutrons and internal section rod vent holes 135 in the middles of the B4C pellets 134 are beneficial to discharge of neutrons; the total length of the B4C pellets 134 of ten internal section rods 13 is about half the height of the reactor core active region;

each sphere articulated joint 12, as shown in FIG. 5, comprises an upper sphere joint 120, a lower sphere joint 121, a flat pin 122 and a locking bead ring 123; the sphere articulated joints 12 not only ensure reliable connection of the adjacent internal section rods 13, but also can ensure mutual flexible rotation between the adjacent internal section rods 13; auxiliary holes 124 and process tanks 125 are formed on the sphere joints so as to bring convenience to assembling and disassembling of the internal section rods 13;

the anti-impact head assembly 14, as shown in FIG. 7, is welded with the internal section rod 13 at the bottommost end into one whole body and comprises a buffer pressure plate 140, a disk spring 141 and an anti-impact head 142;

corresponding to the anti-impact head, a cylindrical shell type shock absorber 61 is arranged at the bottom of the control rod graphite passage 6; as shown in FIG. 1, the cylindrical shell type shock absorber 61 is used for relieving impact of fracture of the inner rod 1 to graphite reactor internals under the condition of an extreme accident and ensuring structural integrity of the graphite internals; and the buffer pressure plate 140 and the disk spring 141 relieve impact of fracture of the outer rod 2 to the inner rod 1 under the condition of the extreme accident, meanwhile, also guarantee the outer rod 2 not to be separated from the control rod driving mechanism, and are convenient to take out and replace the outer rod 2.

Figure 8:
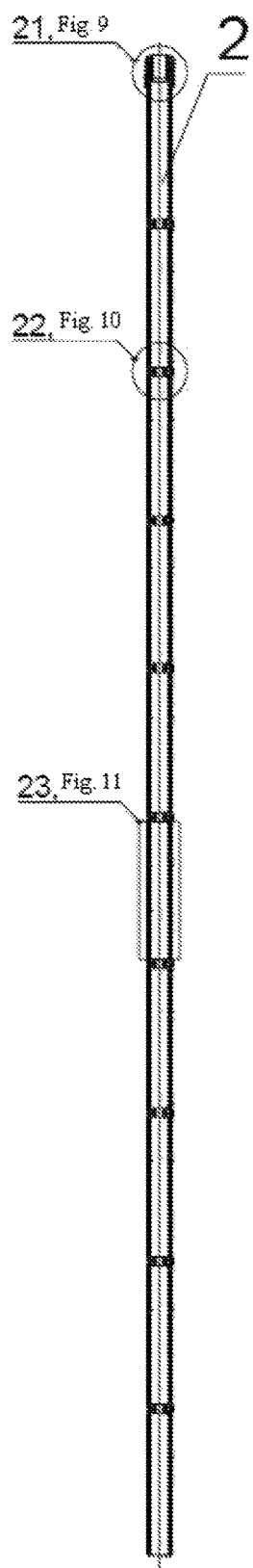
FIG. 8 is a diagram of a multi-section outer rod structure according to one embodiment of the invention.
Figure 9:
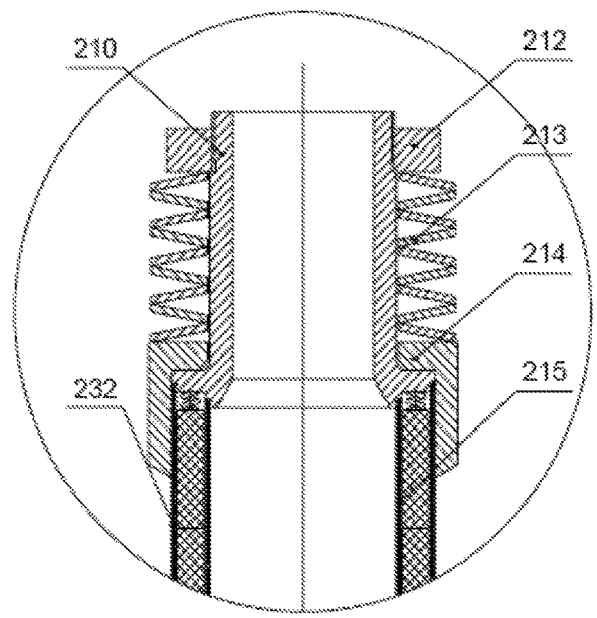
FIG. 9 is a structural diagram of a sliding sleeve type shock absorber assembly in a multi-section outer rod connection structure according to one embodiment of the invention.
Figure 10:
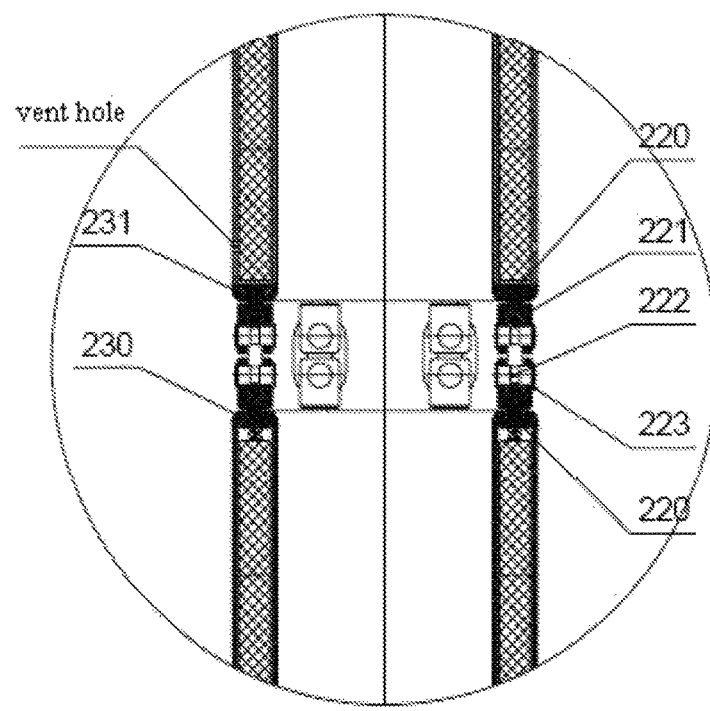
FIG. 10 is a structural diagram of a hanging assembly in the multi-section outer rod connection structure according to one embodiment of the invention.
Figure 11:
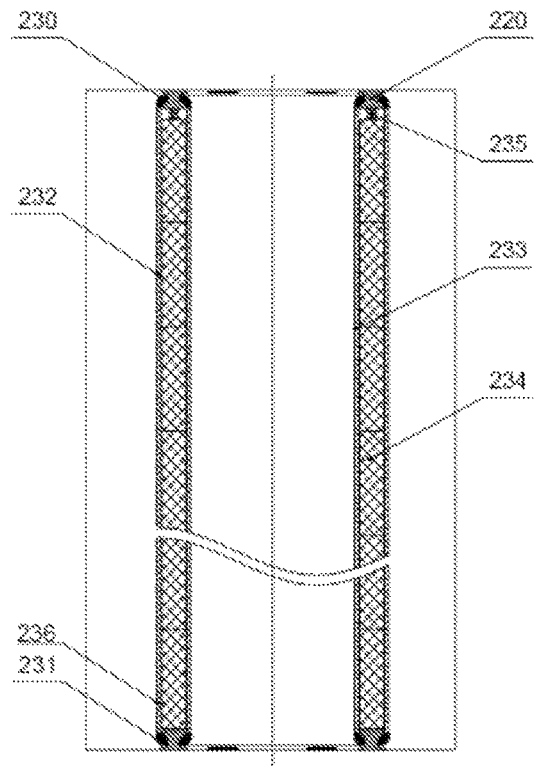
FIG. 11 is a structural diagram of a single external section rod assembly in the multi-section outer rod connection structure according to one embodiment of the invention.

In order to illustrate the multi-section structure clearly, the ten-section structure is illustrated as one example. The detailed structure of the outer rod 2 is as shown in FIG. 8 and the outer rod 2 comprises a sliding sleeve type shock absorber 21, nine hanging assemblies 22 and ten external section rods 23.

wherein the sliding sleeve type shock absorber 21, as shown in FIG. 9, comprises an inner shrunk opening 210, an outer shaft shoulder 211, a pre-tightening pressure plate 212 and a disk spring 213; the inner shrunk opening 210 is combined with the upper end plate 230 of the corresponding external section rod 23 into one whole body and is welded with the inner sleeve 233 of the corresponding external section rod 23; the pre-tightening pressure plate 212 is in threaded connection with the inner shrunk opening 210 and applies a certain pre-tightening three to the disk spring 213; a certain gap is reserved between the outer shaft shoulder 211 and an outer sleeve 232 of the corresponding external section rod 23 and when the outer rod 2 is inserted down under the drive of the driving mechanism or the driving mechanism is powered off and the outer rod 2 falls down, the outer shaft shoulder 211 is collided with the positioning ring 34 at the lower end of a control rod guide tube and slides upwards and the disk spring 213 is deformed by the pressure, so that the gap between the outer shaft shoulder 211 and the outer sleeve 232 takes a shock absorbing effect and still guarantees the corresponding external section rod 23 not to be separated from the outer shaft shoulder 211 under the condition that the disk spring 213 generates the largest deformation;

each external section rod 23, as shown in FIG. 11, is composed of the inner sleeve 233, the outer sleeve 232, an upper end plate 230, a lower end plate 231, a hold-down spring 235 and a B4C pellet 234; the B4C pellets 234 are also welded and packaged in an annular space between the inner and outer sleeves and the end plates and gaps are reserved between the B4C pellets 234 and the inner and outer sleeves as well as the upper end plate so as to compensate irradiation swelling of the B4C pellets 234; in order to prevent the B4C pellets from being displaced, the hold-down springs 235 are arranged between the tops of the B4C pellets 234 and the upper end plates 230; the outer sleeves 232 are provided with external section rod vent holes 236, so that helium generated by the B4C pellets 234 due to irradiation of neutrons can be discharged and jackets of the external section rods 23, which are formed by the inner and outer sleeves and the upper and lower end plates, are prevented from bearing an internal pressure or an external pressure; the B4C pellets 234 are sintered bodies, the required density of the B4C pellets 234 is 2.0 g/cm$^3$ and is smaller than the theoretical density of the B4C pellets 234, and the B4C pellets 234 with high density are easy to irradiate by neutrons to be cracked; the total length of absorbers mounted in ten external section rods 23 is about half the height of the reactor core active region 5;

wherein, each hanging assembly 22, as shown in FIG. 10, is provided with six same hanger ring structures; each hanger ring structure comprises two sphere pendants 220, two cylindrical pins 222, a long hanger ring 221 and two check rings 223; the insides of the upper and lower end plates of the external section rods 23 are slotted and the sphere pendants 220 can be laterally mounted into the upper and lower end plates; the sphere pendants 220 are connected with the long hanger ring 221 by the cylindrical pins 222 and the cylindrical pins 222 are fixed with the check rings 223; the sphere pendants 220 can swing relative to the end plates of the external section rods; gaps are reserved among the sphere pendants 220, the cylindrical pins 222 and the long hanger ring 221; and the check rings 223, the long hanger ring 221 and the cylindrical pins 222 of each hanging assembly 22 are all detachable, and thus, the outer rod 2 is packaged and transported in a form of single external section rods 23 without being integrally packaged and transported, which not only reduces difficulty, but also improves reliability and in addition, has benefits for nuclear power plant field control rod installation.

Figure 12:
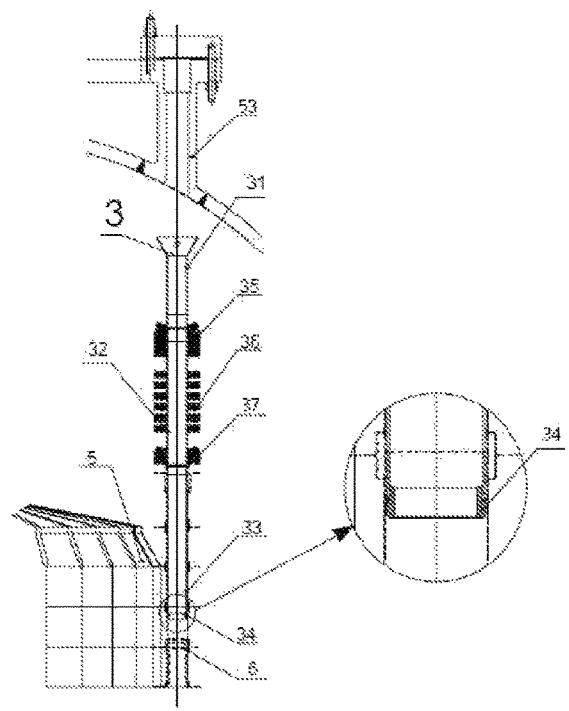
FIG. 12 is a structural diagram of a guide cylinder assembly according to one embodiment of the invention; and in the drawings, 1, inner rod; 2, outer rod; 3, guide cylinder assembly; 4, loop chain; 5, reactor core active region; 6, control rod graphite passage; 11, coupling head assembly; 12, sphere articulated joint; 13, internal section rod; 14, anti-impact head assembly; 21, sliding sleeve type shock absorber; 22, hanging assembly; 23, external section rod; 31, guide cylinder assembly upper segment; 32, guide cylinder assembly middle segment; 33, guide cylinder assembly lower segment, 34, positioning ring; 35, reactor internal upper bearing plate; 36, pressure plate; 37, reactor internal positioning plate; 38, top carbon brick; 51, active region upper edge; 52, active region lower edge; 53, pressure vessel sealing head; 61, cylindrical shell type shock absorber; 110, flat pin; 111, locking bead ring; 112, coupling head; 113, buffer pressure plate; 114, cylinder spring; 115, bearing pressure plate; 116, ceramic ball; 117, bearing bottom plate; 118, sphere joint; 120, upper sphere joint; 121, lower sphere joint; 122, flat pin; 123; locking bead ring; 124, auxiliary hole; 125, process tank; 130, upper end plate; 131, lower end plate; 132, hold-down spring; 133, outer sleeve; 134, B4C pellet; 135, internal section rod vent hole; 140, buffer pressure plate; 141, disk spring; 143, anti-impact head; 210, inner shrunk opening; 211, outer shaft shoulder; 212, pre-tightening pressure plate; 213, disk spring; 220, sphere pendant; 221, long hanger ring; 222, cylindrical pin; 223, check ring; 230, upper end plate; 231, lower end plate; 232, outer sleeve; 233, inner sleeve; 234, B4C pellet; 235, hold-down spring; 236, external section rod vent hole.

As shown in FIG. 12, the guide cylinder assembly 3 is divided into upper, middle and lower segments and each segment has a short length and is convenient to manufacture, produce and install; the upper segment 31 and the middle segment 32 are fixedly mounted on a reactor internal upper bearing plate 35 for metal reactor internals together; the upper segment 31 is positioned above the bearing plate and a large gap is reserved between the upper segment 31 and a reactor pressure vessel sealing head 53 so as to compensate thermal expansion difference between the metal reactor internals and the pressure vessel; the middle segment 32 is positioned under the bearing plate and passes through a plurality of layers of reactor core pressure plates 36; the bottom of the middle segment 32 is inserted into the lower segment 33 of the guide cylinder assembly; the lower segment 33 of the guide cylinder assembly is fixed to a reactor internal positioning plate 37 for the metal reactor internals and is inserted into a top carbon brick 38 and a top reflection layer graphite brick; and a positioning ring 34 is welded at the lower end of the lower segment 33.

The reasons of designing both the inner rod 1 and the outer rod 2 of the telescoped control rod into a multi-section hanging structural form are that the control rod graphite passage 6 is of a graphite piled structure and has the height of over 20 meters so as not to completely ensure straightness of the control rod graphite passage 6 in the mounting process and in addition, the control rod graphite passage 6 is possible to deform due to irradiation of neutrons in the reactor operating process. The multi-section hanging structure can effectively prevent the operation of the outer rod 2 in the control rod graphite passage 6 or the operation of the inner rod 1 in the outer rod 2 from being blocked or jammed. In addition, the sufficiently large gaps are reserved both between the outer rod 2 and the control rod graphite passage 6 and between the inner rod I and the outer rod 2, which facilitates movement of the outer rod 2 and the inner rod 1.

The environmental temperature of the control rod reaches 560 DEG C. under the normal operation condition of the reactor and is close to 1,000 DEG C. under the accident condition, and thus, all metal structural materials of the control rod according to the invention adopt high-temperature resistance nickel-based alloy with good high-temperature endurance; and in order to prevent mutual engaged adhesion of metal contact surface materials in the high-temperature environment, the metal contact surface materials are different in trademarks and are all subjected to solid lubrication processing to keep flexibility of the sphere articulated joints and the hanging assemblies, so that the telescoped control rod has high industrial practicality.

The above embodiments are only used for illustrating the invention, but not intended to limit the invention, and various variations and conversions can be carried out by those common skilled in the related technical fields within the spirit and principle of the invention, and thus, all equivalent technical schemes also belong to the scope of protection of the invention.

The invention claimed is:

1. A telescoped control rod for a pebble-bed high-temperature gas-cooled reactor, comprising an inner rod, an outer rod and a guide cylinder assembly which are vertically and coaxially arranged, wherein the outer rod and the guide cylinder assembly are hollow cylindrical bodies; the top end of the inner rod can move up and down inside the outer rod and the other end of the inner rod moves up and down, along with the top end, inside a control rod passage which is positioned below the guide cylinder assembly and is coaxial with the guide cylinder assembly; and the top end of the outer rod can move up and down in the guide cylinder assembly and the other end of the outer rod moves up and down, along with the top end, inside the control rod passage, wherein the inner rod is of a multi-section structure and comprises a coupling head assembly, an anti-impact head assembly and a plurality of internal section rods connected in series by sphere articulated joints, one end of the coupling head assembly is connected with the internal section rod at a first section and the other end of the coupling head assembly is connectable with a loop chain of a control rod driving mechanism; and one end of the anti-impact head assembly is connected with the internal section rod at a tail section, wherein the coupling head assembly comprises a coupling head, a flat pin, a locking bead ring, a buffer pressure plate, a cylinder spring, a bearing pressure plate, a ceramic ball, a bearing bottom plate and a sphere joint; the coupling head is connected with the loop chain of the control rod driving mechanism by the flat pin and the locking bead ring is used for encircling and fastening the flat pin; and the buffer pressure plate is arranged on the cylinder spring to form a buffer structure, the buffer structure is externally arranged on the side wall of the coupling head, the sphere joint is in threaded connection with the bearing pressure plate and is in spherical fit with an internal section rod upper end plate, a thrust bearing structure is formed by the ceramic ball, the bearing pressure plate and the bearing bottom plate together, and the thrust bearing structure is externally sleeved by the coupling head.

2. The telescoped control rod for the pebble-bed high-temperature gas-cooled reactor according to claim 1, wherein each internal section rod comprises an outer sleeve, the upper end plate and a lower end plate which are respectively positioned at both ends of the outer sleeve, and a B4C pellet which is welded and packaged between the upper end plate and the lower end plate and is positioned in the outer sleeve; gaps are reserved between the B4C pellet and the outer sleeve and between the B4C pellet and the upper end plate; and a hold-down spring is arranged between the B4C pellet and the upper end plate.

3. The telescoped control rod for the pebble-bed high-temperature gas-cooled reactor according to claim 2, wherein the anti-impact head assembly comprises a buffer pressure plate, a disk spring and an anti-impact head of which the side wall is provided with a bulge; and the disk spring is arranged between the bulge and the buffer pressure plate.

4. The telescoped control rod for the pebble-bed high-temperature gas-cooled reactor according to claim 1, wherein the guide cylinder assembly is fixedly mounted on an upper bearing plate for metal reactor internals and comprises an upper segment, a middle segment and a lower segment; the upper segment and the middle segment are fixedly mounted on the upper bearing plate for the metal reactor internals together; the upper segment is positioned above the bearing plate and a gap is reserved between the upper segment and a reactor pressure vessel sealing head; the middle segment is positioned under the bearing plate and passes through a plurality of layers of reactor core pressure plates; the bottom of the middle segment is inserted into the lower segment; the lower segment is fixed to a metal reactor internal positioning plate; and a positioning ring is welded at the lower end of the lower segment.

5. A telescoped control rod for a pebble-bed high-temperature gas-cooled reactor, comprising an inner rod, an outer rod and a guide cylinder assembly which are vertically and coaxially arranged, wherein the outer rod and the guide cylinder assembly are hollow cylindrical bodies; the top end of the inner rod can move up and down inside the outer rod and the other end of the inner rod moves up and down, along with the top end, inside a control rod passage which is positioned below the guide cylinder assembly and is coaxial with the guide cylinder assembly; and the top end of the outer rod can move up and down in the guide cylinder assembly and the other end of the outer rod moves up and down, along with the top end, inside the control rod passage, wherein a top inner shrunk opening and a top outer shaft shoulder are formed at the top of the outer rod; and the outer rod is of a multi-section structure and comprises a sliding sleeve type shock absorber, hanging assemblies and a plurality of external section rods, the hanging assemblies are connected with the corresponding external section rods, and the sliding sleeve type shock absorber is connected with the external section rod at a first section, and wherein each external section rod comprises an inner sleeve, an outer sleeve, an upper end plate, a lower end plate, a hold-down spring and a B4C pellet; the B4C pellet is mounted in an annular space defined by the inner sleeve, the outer sleeve, the upper end plate and the lower end plate and gaps are reserved between the B4C pellet and the inner and outer sleeves as well as the upper end plate; the hold-down spring is arranged between the B4C pellet and the upper end plate; and the outer sleeve is provided with a vent hole.

6. The telescoped control rod for the pebble-bed high-temperature gas-cooled reactor according to claim 5, wherein the guide cylinder assembly is fixedly mounted on an upper bearing plate for metal reactor internals and comprises an upper segment, a middle segment and a lower segment; the upper segment and the middle segment are fixedly mounted on the upper bearing plate for the metal reactor internals together; the upper segment is positioned above the bearing plate and a gap is reserved between the upper segment and a reactor pressure vessel sealing head; the middle segment is positioned under the bearing plate and passes through a plurality of layers of reactor core pressure plates; the bottom of the middle segment is inserted into the lower segment; the lower segment is fixed to a metal reactor internal positioning plate; and a positioning ring is welded at the lower end of the lower segment.

7. The telescoped control rod for the pebble-bed high-temperature gas-cooled reactor according to claim 5, wherein all the hanging assemblies are the same in the number of hanger ring structures arranged; each hanger ring structure comprises two sphere pendants, two cylindrical pins, a long hanger ring and two check rings; the sphere pendants are mounted in inner side grooves of the upper end plates and the lower end plates; the sphere pendants are connected with the long hanger ring by the cylindrical pins and the cylindrical pins are fixed by the check rings; and gaps are reserved among the sphere pendants, the cylindrical pins and the long hanger.

* * * * *